United States Patent
Chang et al.

(10) Patent No.: US 10,354,301 B2
(45) Date of Patent: Jul. 16, 2019

(54) MOBILE POWER SOURCE AND METHOD OF USE

(71) Applicant: Jason Wong, Los Angeles, CA (US)

(72) Inventors: Jeffrey Chang, San Francisco, CA (US); Doktor Gurson, San Francisco, CA (US)

(73) Assignee: Omnicharge, Inc., Los Angeles, CA (US)

( * ) Notice: Subject to any disclaimer, the term of this patent is extended or adjusted under 35 U.S.C. 154(b) by 628 days.

(21) Appl. No.: 14/871,702

(22) Filed: Sep. 30, 2015

(65) Prior Publication Data

US 2016/0098770 A1 Apr. 7, 2016

Related U.S. Application Data

(60) Provisional application No. 62/059,105, filed on Oct. 2, 2014.

(51) Int. Cl.
*G06Q 30/00* (2012.01)
*G06Q 30/06* (2012.01)
(Continued)

(52) U.S. Cl.
CPC ....... *G06Q 30/0601* (2013.01); *G06Q 20/145* (2013.01); *G06Q 20/3223* (2013.01);
(Continued)

(58) Field of Classification Search
CPC .............. G06Q 50/01; G06Q 30/0269; G06Q 30/06–0645; G06Q 30/08; G06Q 20/145;
(Continued)

(56) References Cited

U.S. PATENT DOCUMENTS 6,665,549 B1 * 12/2003 Reed ............... H04W 4/02 455/573
6,823,459 B1 * 11/2004 Horikoshi ............ G06F 21/35 713/300

(Continued)

FOREIGN PATENT DOCUMENTS

GB 2528911 A 10/2016
WO 2016020645 A1 2/2016

OTHER PUBLICATIONS

Buennemeyer, "Battery-Sensing Intrusion Protection for Wireless Handheld Computers Using a Dynamic Threshold Calculation Algorithm for Attack Detection," Jan. 2007, Proceedings of the 40th Hawaii International Conference on System Sciences—2007, 9pp. (Year: 2007).*

*Primary Examiner* — Adam L Levine
(74) *Attorney, Agent, or Firm* — Rhodes Donahoe, LLC; Robert V. Donahoe

(57) ABSTRACT

A method for providing electrical energy to a user device associated with a user includes: identifying a communications link between the user device and the mobile charging system; sending a user identifier to a remote server associated with the application; verifying a user eligibility for electrical energy provision to the device based on the user identifier; verifying a data integrity of mobile charging system software; controlling the mobile charging system to provide electrical energy to the user device; and controlling the mobile charging system to adjust electrical energy provision to the user device.

8 Claims, 6 Drawing Sheets

(51) Int. Cl.
| | |
|---|---|
| *H04W 4/20* | (2018.01) |
| *H04W 4/02* | (2018.01) |
| *G06Q 30/02* | (2012.01) |
| *H02J 7/00* | (2006.01) |
| *G06Q 20/14* | (2012.01) |
| *G06Q 20/32* | (2012.01) |
| *G06Q 20/36* | (2012.01) |
| *G06Q 20/40* | (2012.01) |
| *G07F 15/00* | (2006.01) |
| *H04L 29/08* | (2006.01) |

(52) U.S. Cl.
CPC ..... *G06Q 20/3674* (2013.01); *G06Q 20/4014* (2013.01); *G06Q 30/0269* (2013.01); *G06Q 30/0609* (2013.01); *G07F 15/006* (2013.01); *H02J 7/0052* (2013.01); *H04W 4/023* (2013.01); *H04W 4/20* (2013.01); *H02J 2007/0001* (2013.01); *H02J 2007/0096* (2013.01); *H04L 67/306* (2013.01)

(58) Field of Classification Search
CPC ........... G06Q 20/3223; G06Q 20/3674; G06Q 20/4014; G07F 15/006; H02J 2007/0001; H02J 2007/0096; H02J 7/0052; H04L 67/306; H04W 4/023; H04W 4/20
See application file for complete search history.

(56) References Cited

U.S. PATENT DOCUMENTS

| | | | |
|---|---|---|---|
| 8,618,770 B2* | 12/2013 | Baarman | H02J 7/025 320/108 |
| 9,537,994 B2* | 1/2017 | Baldasare | H04M 1/72522 |
| 10,008,889 B2* | 6/2018 | Bell | G06F 1/1635 |
| 2009/0181641 A1 | 7/2009 | Fiatal | |
| 2011/0258467 A1* | 10/2011 | Antoci | G06F 1/1632 713/310 |
| 2012/0150670 A1* | 6/2012 | Taylor | G06Q 20/10 705/16 |
| 2013/0088192 A1 | 4/2013 | Eaton | |
| 2014/0375261 A1 | 12/2014 | Manova-Elssibony et al. | |
| 2016/0100312 A1 | 4/2016 | Bell et al. | |

* cited by examiner

MOBILE POWER SOURCE AND METHOD OF USE

CROSS-REFERENCE TO RELATED APPLICATIONS

This application claims the benefit of U.S. Provisional Application Ser. No. 62/059,105, filed on 2 Oct. 2014, which is incorporated herein in its entirety by this reference.

TECHNICAL FIELD

This invention relates generally to the power management field, and more specifically to a new and useful system and method of providing power to users in transit in the power management field.

BACKGROUND

With the increased popularity of high-performance portable user devices, power management has been an increasingly prevalent problem. Even though innovations in battery technologies have enabled more convenient and faster battery charging, larger battery capacities, and higher energy densities, device power requirements have increased to meet the larger amounts of energy available. This pattern results in maintenance of the current charging paradigm, in which portable user devices must be charged at least once a day. However, many users do not carry chargers when they are away from work or home, and even if a user carries a charger, power outlets are limited and difficult to find. This results in users relying on venues, such as bars or hotels, to supply power outlets or chargers. This can be frustrating for the user because power outlets are limited in supply, and charging the device from an outlet confines the user to a limited space about the outlet. This can also be frustrating to venue owners, because the users will ask the venue employees to manage device charging for them (e.g., when the outlet is behind a bar or in an inaccessible area).

Thus, there is a need in the power management field to create a new and useful system and method of providing power to users in transit. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

As shown in FIGS. 1B, 5, 6, and 7, a method 100 for providing electrical energy to a user device associated with a user includes: identifying a communications link between the user device and the mobile charging system S140; sending a user identifier to a remote server associated with the application S150; verifying a user eligibility for electrical energy provision to the device based on the user identifier S160; verifying a data integrity of mobile charging system software S170; controlling the mobile charging system to provide electrical energy to the user device S180; and controlling the mobile charging system to adjust electrical energy provision to the user device S190.

Figure 1A:
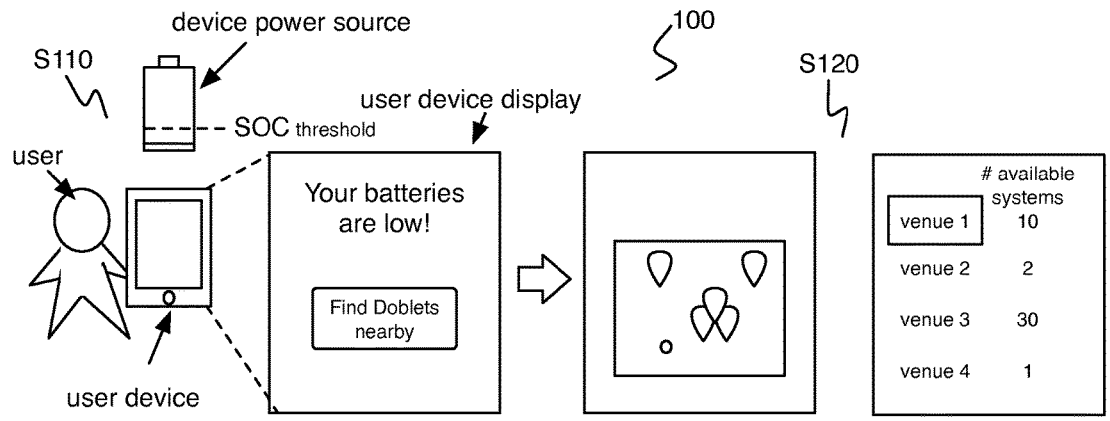
FIGS. 1A and 1B are schematic representations of an example of the method of utilizing a mobile charging system to provide electrical energy to a user device.
Figure 6:
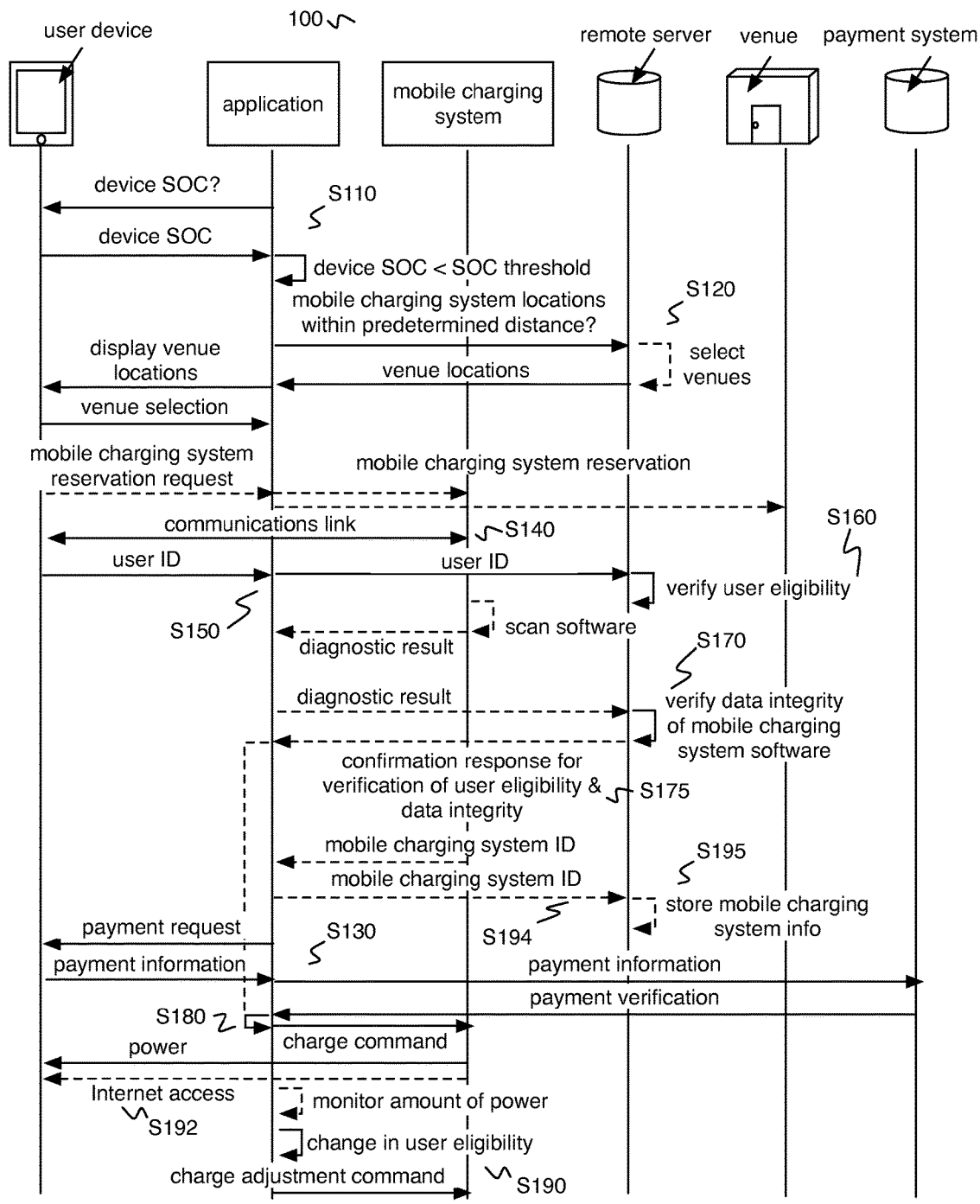
FIG. 6 is a schematic representation of a first variation of the method of utilizing a mobile charging system.
Figure 7:
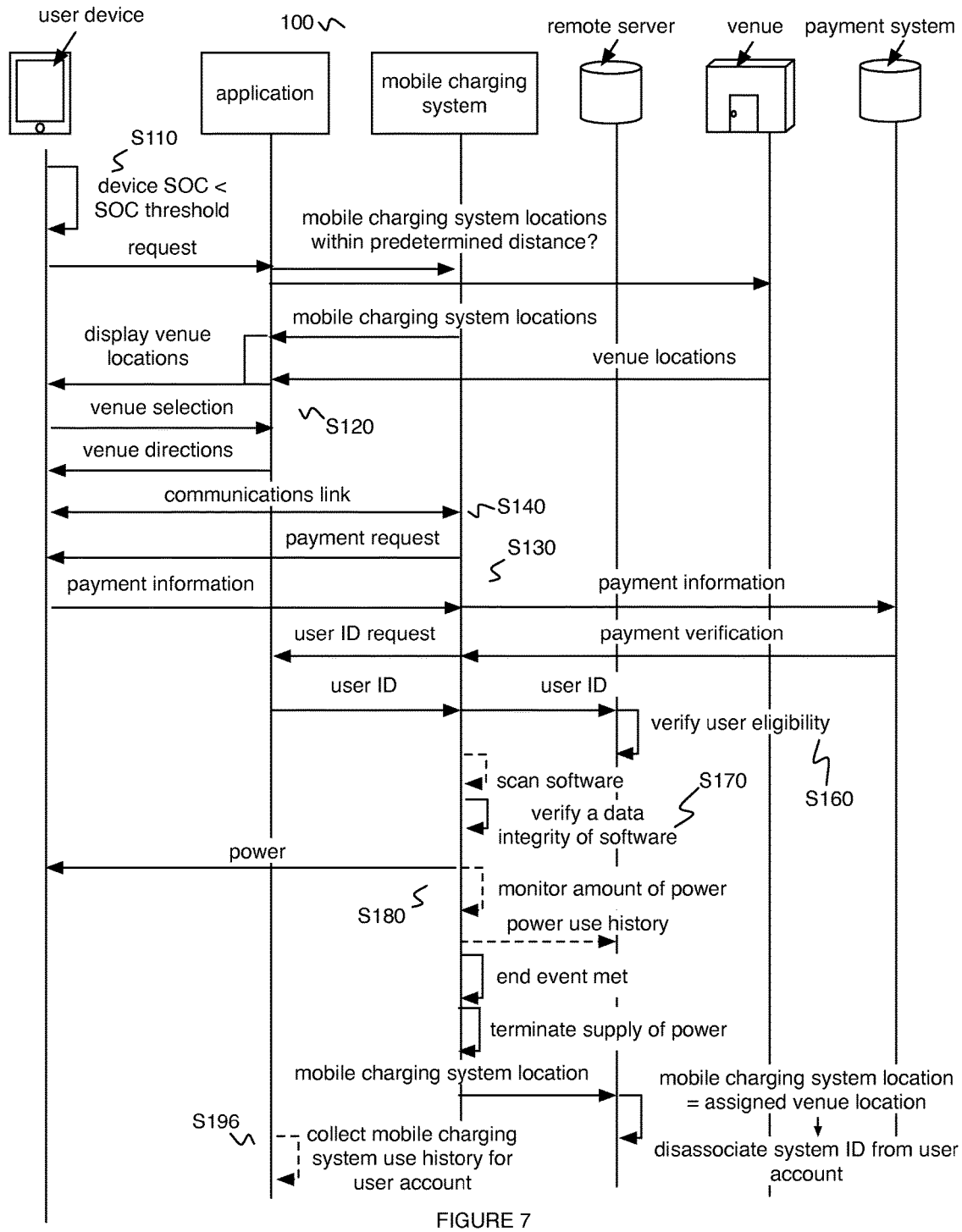
FIG. 7 is a schematic representation of a second variation of the method of utilizing a mobile charging system.

As shown in FIGS. 1A, 6, and 7, the method 100 can additionally include detecting a user device state of charge (SOC) below a SOC threshold S100; and directing, via the application, the user to a venue associated with a mobile charging system S120. As shown in FIG. 7, in alternative embodiments, the method can further include collecting mobile charging system use history for the user account S190. The use history can be used for targeting advertisements, promoting venues, or performing any other suitable action.

The method 100 functions to permit users to rent a mobile power source at different venues to charge their devices. This method confers several benefits. First, by providing a mobile charging system, the method permits the user to move about the venue and interact with other people as they typically would in the given register, frees users from having to carry around a charger and attempt to find an open outlet, frees vendors from having to keep up with connector standards, and decreases venue employee inefficiencies because the employees no longer have to remember which device belongs to the user and retrieve the correct device. Second, by stationing the mobile charging systems at physical venues, the method brings users to the venue. Third, because device charging requires time, the method retains users at the venue for a period of time. Fourth, by learning the mobile charging system use history of the user or by tracking the geographic location of mobile charging systems connected to user devices, the method facilitates communication of promotions targeted to the user.

The method 100 can be performed in whole or in part by the mobile charging system, by the user device, by a remote server, or by any other suitable processing system. When performed by a user device, the method can be performed by a native application, a browser application, or by any other suitable software.

1. Mobile Charging System.

Figure 2:
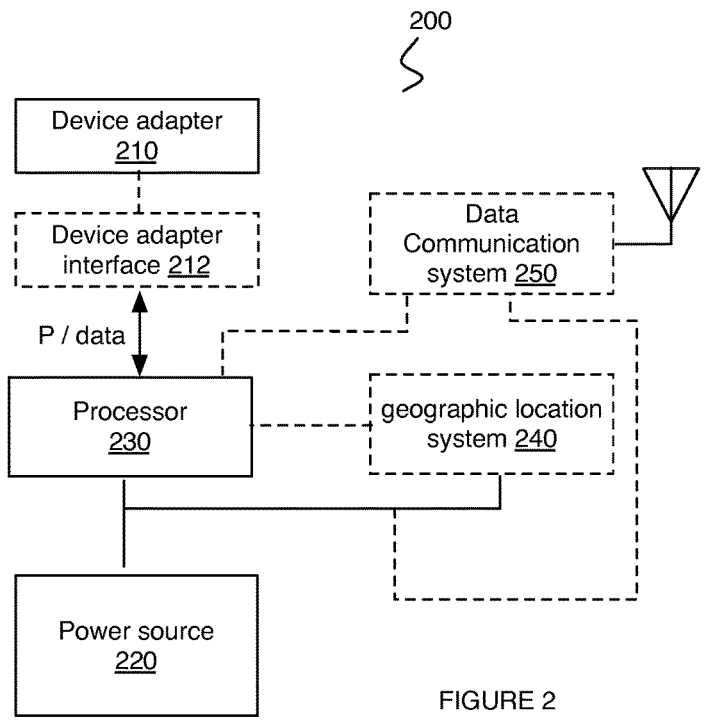
FIG. 2 is a schematic representation of a variation of the mobile charging system.

The method is preferably performed with a mobile charging system 200, which functions to provide electrical energy to the user device. The method can alternatively be performed with any other suitable power source. As shown in FIG. 2, the mobile charging system 200 preferably includes a device adapter 210, a device adapter interface 212, a power source 220, and a processor 230 configured to control power supply from the power source 220 to the mobile device adapter 210. The mobile charging system 200 can additionally or alternatively include a data communication mechanism, location mechanism, or any other suitable module. However, the mobile charging system 200 can include any other suitable component.

The device adapter 210 of the mobile charging system 200 functions to electrically connect the mobile charging system 200 with a user device. The device adapter 210 can additionally function to transmit power from the mobile charging system 200 to the user device. The device adapter 210 can additionally function to transmit data between (e.g., to and/or from) the mobile charging system 200 and the user device. The device adapter 210 can additionally include the device adapter interface 212, which functions to facilitate a connection between the device adapter 210 and the processor 230. Alternatively, the device adapter 210 and processor 230 can be connected without a device adapter interface, but any other suitable means of connection can be used. The device adapter 210 preferably transiently couples to the user device, and can mechanically couple to the user device using a retention mechanism (e.g., magnets, magnet pairs, clips, etc.). The device adapter 210 is preferably interchangeable and removably couples to the mobile charging system 200, but can alternatively be statically coupled to the mobile charging system 200. Examples of the device adapter 210 include a micro-USB connector, a USB on-the-go connector, a Firewire connector, and a Lighting Connector™, but any other connector can be used.

The power source 220 of the mobile charging system 200 functions to supply power to the user device when the mobile charging system 200 is electrically connected to the user device. The power source 220 can additionally function to supply power to the components of the mobile charging system 200. The power source 220 preferably includes an energy capacity at least equal to or larger than the amount of power required to fully charge a user device with any SOC (e.g., from 0% SOC to 100% SOC, from 5% SOC to 98% SOC, etc.), but can alternatively be performed with devices having a smaller energy capacity. In a specific example, the battery unit has an energy capacity substantially equal to two user device charges (e.g., two tablet charges, two smartphone charges, 4,600 mAh, etc.). The power source 220 is preferably capable of charging and/or discharging in a set of modes, wherein each mode is associated with a different charge or discharge rate. However, the power source 220 can be charged or discharged at a single rate or in any other suitable manner.

In a first variation, the power source 220 is a battery unit. The battery unit is preferably formed from a set of battery cells (e.g., one or more cells), but can alternatively be otherwise formed. The battery cells are preferably connected together in parallel, but can alternatively be connected together in series, in a combination of parallel and series connections, or connected in any other suitable manner. The battery cells are preferably secondary cells (e.g., rechargeable cells), but can alternatively be primary cells or any other suitable battery cells. The battery chemistry can be lithium chemistry, copper chemistry, nickel chemistry, polymer chemistry, or have any other suitable chemistry. Examples of battery chemistries include lithium ion, lithium polymer and nickel cadmium, but any other battery chemistry can be used.

In a second variation, the power source 220 can be a renewable energy source, such as a solar cell or any other suitable renewable energy source or energy harvesting system. Alternatively, the power source 220 can be a fuel cell (with accompanying fuel supply) or any other suitable power source.

Figure 4:
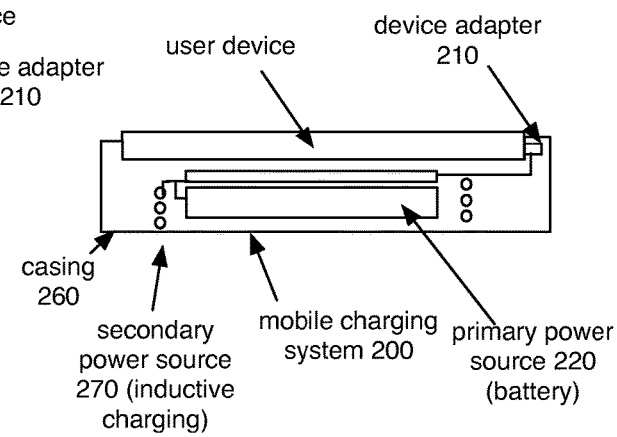
FIG. 4 is a cutaway schematic representation of a second variation of the mobile charging system.

As shown in FIG. 4, in a third variation, the power source 220 can be an energy adapter that functions to receive power from a secondary power source 270. In this variation, the mobile charging system 200 can function as an adapter configured to convert a power from a first power standard into power suitable for the mobile device. The energy adapter can be an inductive charging coil (e.g., Qi-compatible, PMA-compatible, etc.), a WiFi energy receiver, an EM energy receiver, a sound energy receiver, a piezoelectric device, or any other suitable adapter. In this variation, the mobile charging system 200 can additionally include an energy-reflective coating that is selectively applied to portions of the mobile charging system 200 to reflect and thereby protect EM-sensitive components (e.g., a PCB).

The processor 230 of the mobile charging system 200 functions to control power supply to the user device. The processor 230 can additionally function to record the amount of power supplied, determine the SOC of the mobile charging system 200 power supply, store the mobile charging system identifier, control data transmission through the device adapter 210 and/or data communication system 250, control location determination using the user device and/or location system 240, manage power source 220 charge and/or discharge, manage master/slave configurations, perform all or a portion of the method, or perform any other suitable functionality. The processor can be a microprocessor, CPU, GPU, or be any other suitable processing unit.

The mobile charging system 200 can additionally include a data communication system 250 that functions to communicate data to a remote processor 230, such as a server. The data communication system 250 is preferably a wireless communication system, but can alternatively or additionally be a wired communication system that controls data communication to the user device through the device adapter 210. The data communication system 250 can be a long-range communication system or a short-range communication system. Examples of long-range communication systems include WiFi and cellular communication, but any other suitable long-range communication system 250 can be used. Examples of short-range communication system 250s include Bluetooth (e.g., low energy), NFC, and RF, but any other suitable short-range communication system can be used. The data communication system 250 preferably enables direct communication with a local network (e.g., set up by a venue's router), but can alternatively or additionally form a mesh network with other mobile charging systems 200. The data communication system 250 can additionally connect to and communicate with the user device, a remote server system, or any other suitable system. The mobile charging system 200 can include one or more data communication systems 250, wherein different data communication systems 250 can be selected for different functionalities or be used in different operation states (e.g., low energy operation states vs. high energy operation states).

The mobile charging system 200 can additionally include a location system 240 that functions to determine the geographic location of the mobile charging system 200. A location can be a set of geographic coordinates (e.g., latitude and longitude), a place name (e.g., county, city, landmark, intersection, etc.), a physical street address, a business name, a distance from a given location, presence within a specified radius from a given location, a graphical depiction on a map, or any other suitable location expression. Determining the geographic location of the mobile charging system 200 (geolocation) can involve geocoding to find associated latitude and longitude from other geographic data. Geolocation can additionally or alternatively involve reverse geocoding to back code latitude and longitude coordinates to a readable address or place name. The location can be determined based on GPS coordinates provided by a GPS system, triangulation between mobile phone towers and public masts (e.g., assistive GPS), Wi-Fi connection location, WHOIS performed on IP address or MAC address, GSM/CDMA cell IDs, location information self-reported by a user, information reported by a short-range communication system 250 (e.g., an RFID tag), or determined in any other suitable manner. The location system 240 can be a GPS system, cellular tower triangulation system, or any other suitable location system 240. However, the mobile charging system 200 can include any other suitable location system 240. The geographic location of the mobile charging system 200 can be used for tracking misplaced mobile charging systems 200, targeting promotions, determining availability of mobile charging systems, and/or any other suitable purpose.

Figure 3:
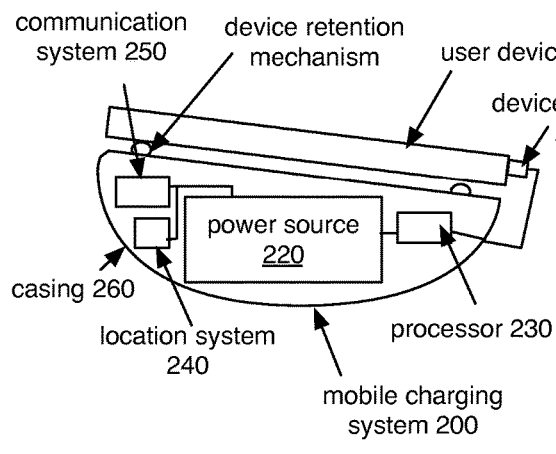
FIG. 3 is a cutaway schematic representation of a first variation of the mobile charging system.

The mobile charging system 200 can additionally be used with a casing 260 that functions to encase and mechanically protect the components of the mobile charging system 200. The casing 260 is preferably profiled according to the desired mobile charging system use case. In a first variation as shown in FIG. 3, the mobile charging system 200 is hand-held, wherein the casing 260 is preferably profiled with a convex curvature along a first broad face to accommodate for a user's hand, and a substantially flat surface along a second broad face to accommodate for the profile of a user device. The first and/or second broad faces can additionally be textured retention features, or include gripping material (e.g., rubber) to facilitate temporary hand and/or device retention. In a second variation as shown in FIG. 4, the mobile charging system 200 is configured to rest on a planar surface, such as a table. In this variation, the first and second opposing broad faces of the casing 260 can be substantially planar to accommodate the surface profile of the planar surface and user device, respectively. However, the casing 260 can be otherwise configured.

The method is preferably utilized with a user device. More preferably, the method uses the mobile charging system 200 to charge the user device. Examples of the user device include a tablet, smartphone, mobile phone, laptop, watch, wearable device (e.g., glasses), or any other suitable user device. The user device preferably includes power storage (e.g., a battery) and a processor, and can additionally include a display, a user input (e.g., a keyboard, touchscreen, accelerometer, microphone, etc.), a location system (e.g., a GPS system), a data communication system (e.g., a WiFi module, cellular module, etc.), or any other suitable component. The location system of the user device can be used to determine location of the nearest mobile charging systems 200 to the user device. The location system of the user device can additionally be used to determine the location of the respective mobile charging system 200 when the mobile charging system 200 is connected to the user device. The data communication system can be used to validate user charging permissions for the mobile charging system 200.

The user associated with the user device is preferably associated with a user account. The user device can be associated with the user account by a user login or associated in any other suitable manner. The user account can include information such as user preferences (e.g., venue preferences, charge unit preferences, warning SOC thresholds, charging cessation SOC thresholds, charging rates, etc.), user devices (e.g., make, model, device identifiers, etc.), payment information, user charging credits (e.g., subscriptions, one-time payments, pre-paid credits, etc.), a user eligibility for the mobile charging system 200 to provide electrical energy to the user device, a user profile, or any other suitable information for the user. The user account can additionally be associated with a set of user identifiers that uniquely identify the user. The user identifiers can include device identifiers, phone numbers, addresses, geographic location patterns, payment information, physiological identifiers (e.g., fingerprint information), or any other suitable user identifier. The user account can be stored by a remote server, and can additionally be stored in association with a user device identifier. Alternatively, the user account or identifier thereof can be stored by the user device (e.g., by an application on the device) or stored in any other suitable manner.

The mobile charging systems 200 are preferably stored at or otherwise associated with a venue. The venue is preferably associated with a geographic location, wherein the geographic location can be any suitable location expression. The venue can be a business, a kiosk, a vending machine, a residence, or any other suitable venue. Alternatively, the mobile charging systems 200 can be interchangeably associated with a set of venues. In one example, the user can obtain a mobile charging system 200 from a first venue, utilize the mobile charging system 200 to charge their user device while walking to a second venue, and return the mobile charging system 200 to the second venue.

The business and/or venue is preferably located in a physical building associated with a geographic location, and can additionally include a data communication system (e.g., a WiFi network) and a set of power supplies (e.g., power outlets) connected to a power grid or a renewable energy source. The business can additionally have a charging hub connected to the power supply, wherein the charging hub functions to mechanically retain and charge a set of mobile charging systems 200 with power from the business power supply. The charging hub can additionally function to manage mobile charging system 200 charging (e.g., battery management). The charging hub can additionally be wirelessly- or wire-connected to the business data communication system, wherein the charging hub can additionally monitor and report the number of mobile charging systems 200 physically connected to the charging hub, the SOC status of each mobile charging system 200, or monitor and/or communicate any other suitable mobile charging system 200 parameter. Examples of businesses include bars, cafés, restaurants, malls, airports, airlines, and hotels, but any other suitable business can have the mobile charging system 200.

The kiosk preferably includes a stand that physically retains and charges a set of mobile charging systems 200 from a power grid, renewable energy source retained by the kiosk, or any other suitable power source. The kiosk is preferably free-standing and unaffiliated with a physical business venue, but can alternatively be located within a business venue. In a specific variation of the kiosk, the kiosk physically or digitally unlocks a mobile charging system 200 for user device charging in response to receipt of a user email address, payment, remote notification, or any other suitable user identification or unlock instruction at the kiosk. The unlock instruction can be received at the kiosk directly from the user, from a user device (e.g., through a wireless or wired communication), or received in any other suitable manner. In one example, a mobile charging system 200 can be unlocked by the kiosk in response to receipt of a notification at the kiosk from a user device, wherein the user device sends the kiosk the notification in response to receipt of a user input at the application to unlock the mobile charging system 200. In another example, an unlock instruction can be received at the kiosk, the mobile charging system 200 will unlock, and the user can travel (e.g., around a retail store, to a different retail store, etc.) with the mobile charging system 200 while the mobile charging system 200 charges the user device. The kiosk can additionally include a data communication system 250 that functions to transmit information (e.g., payment verification information, a mobile charging system identifier, a user device identifier, mobile charging system data) to a remote server. The data communication system 250 can additionally function to support mobile charging system 200 communication with the remote server, user device communication with a remote server, or any other suitable communication.

The system and method can additionally function to collect mobile charging system use history for one or more users. The mobile charging system use history can include records of the mobile charging systems 200 used by a user, the types of mobile charging systems 200 used by a user, the venues selected or visited by the user for the mobile charging system 200 use, the times associated with mobile charging system 200 use, the conversion rate between venue display and/or mobile charging system 200 reservation and actual user appearance at the venue, or any other suitable mobile charging system-related information.

2. Method of Use.

As shown in FIGS. 1B, 5, 6, and 7, a method 100 for providing electrical energy to a user device associated with a user includes: identifying a communications link between the user device and the mobile charging system S140; sending a user identifier to a remote server associated with the application S150; verifying a user eligibility for electrical energy provision to the device based on the user identifier S160; verifying a data integrity of mobile charging system software S170; controlling the mobile charging system to provide electrical energy to the user device S180; and controlling the mobile charging system to adjust electrical energy provision to the user device S190.

Figure 5:
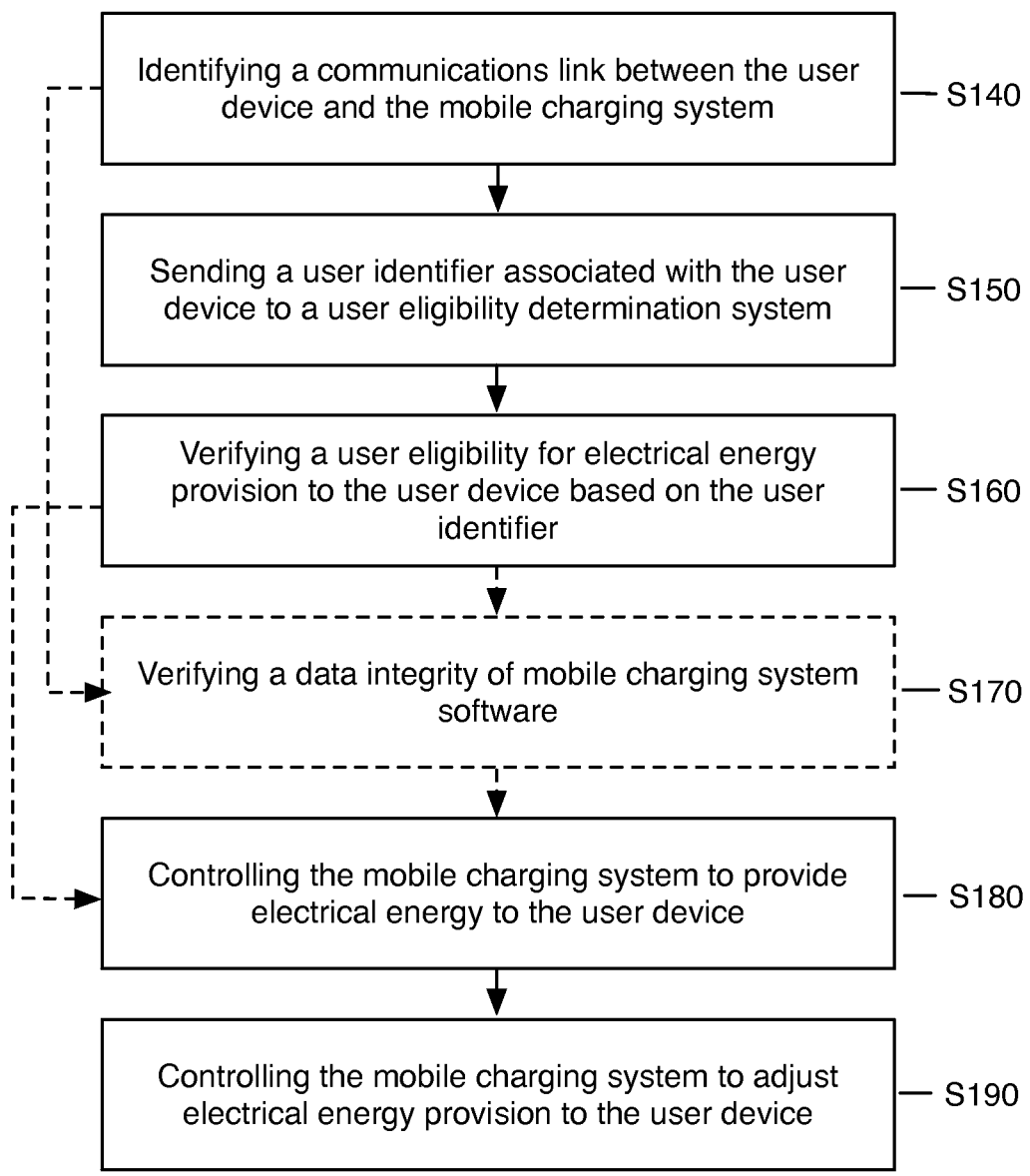
FIG. 5 is a block diagram of the method of utilizing a mobile charging system.

As shown in FIGS. 1A, 6, and 7, the method 100 can additionally include detecting a user device state of charge (SOC) below a SOC threshold S100; and directing, via the application, the user to a venue associated with a mobile charging system S120. All or a portion of the method 100 can be performed by the application (an example of which is shown in FIG. 5), the mobile charging system as described above (an example of which is shown in FIG. 6), a different charging system, a remote server, or any other suitable computing system.

a. Identifying a Communications Link.

Identifying a communications link between the user device and the mobile charging system S140 functions to identify an established connection for communications between the user device and the mobile charging system. Preferably, the application identifies the communications link. Alternatively, the mobile charging system or any other suitable component identifies the communication link. The communications link is preferably a communication connection established between a first and second communications module (e.g., transmitter, transceiver, receiver, etc.) of a first and second endpoint, but can alternatively be established in any suitable manner. The communications link is preferably established over a connected wired electrical connection (e.g., a micro-USB connector, a USB on-the-go connector, a Firewire connector, a Lightning Connector™). However, the communications link can alternatively be established over a wireless connection (e.g., WiFi, Bluetooth, etc.). The communications link preferably facilitates power transmission from the mobile charging system to the user device. Additionally or alternatively, the communications link can facilitate data transmission between the user device and the mobile charging system.

b. Sending a User Identifier.

Sending a user identifier to a remote server associated with the application S150 functions to facilitate verification of user eligibility by informing the remote server of the identity of the user or user device. The application preferably sends the user identifier to the remote server. However, the mobile charging system or any other suitable component can alternatively send the user identifier to the remote server. The user identifier is preferably sent to the remote server through a wireless network (e.g., WiFi, cellular network, etc.), but can alternatively be sent through a wired connection or through any other suitable communications link. The user identifier is preferably sent to the remote server in response to identification of the communications link between the user device and the mobile charging system S140. However, the user identifier can be sent to the remote server without first identifying the communications link, such as when the user opens the application before a communications link is established between the user device and mobile charging system. The user identifier can include device identifiers, phone numbers, addresses, geographic location patterns, payment information, physiological identifiers (e.g., fingerprint information), or any other suitable user identifier. Further, the user identifier can be associated with a user account, and the remote server can utilize the user identifier to look up user account information stored at the remote server. However, the user identifier can be associated (e.g., permanently or temporarily) with a mobile charging system (e.g., through a mobile charging system identifier), or otherwise used. Alternatively, the user identifier can be independent and not associated with a user account.

c. Verifying User Eligibility.

Verifying a user eligibility for electrical energy provision to the device based on the user identifier S160 functions to confirm that the user device—associated with the user and/or the user account—is eligible to receive electrical energy from the mobile charging system. The remote server preferably verifies the user eligibility S160; however, the mobile charging system, the application, or other suitable components can alternatively or additionally verify the user eligibility. The remote server preferably verifies the user eligibility S160 by leveraging the user identifier to look up user account information. The user account information preferably specifies whether the user (e.g., the user account or user device) is eligible for energy provision from mobile charging system. However, verification of user eligibility S160 can also be based on the user device (e.g., user device identifier), mobile charging system (e.g., mobile charging system identifier), venue (e.g., physical geographic location or region), or based on any other suitable parameter. For example, a new user promotion can allow a user device to be eligible to receive electrical energy despite a lack of association with a user account. Additionally or alternatively, the user eligibility can also be based on the type of user device (e.g., specified types of mobile phones, tablets, smartphones, laptops, watches, wearable devices (e.g., glasses), etc.), the status of the user device software (e.g., unmodified software, current operating system version, etc.), or any other suitable criteria.

In a first variation, verification of user eligibility S160 includes determining an amount of electrical energy for the mobile charging system to supply to the user device. The amount of electrical energy supplied can be specified in terms of joules. The electrical energy provision can also be specified in terms of power (i.e., watts or energy/time). Alternatively, the amount of electrical energy can be specified in terms of the amount of energy necessary to bring the user device to a goal SOC. For example, a user can purchase a full-charge credit for their user device, which translates to purchasing an amount of electrical energy sufficient to bring the user device to a 100% SOC (e.g., equivalent to 4,600 mAh for a first device, but 8,000 mAh for a second device). The goal SOC can be a single SOC percentage (e.g., 60%). The goal SOC can also be a goal SOC range (e.g., a SOC in between 70-80%).

Figure 8:
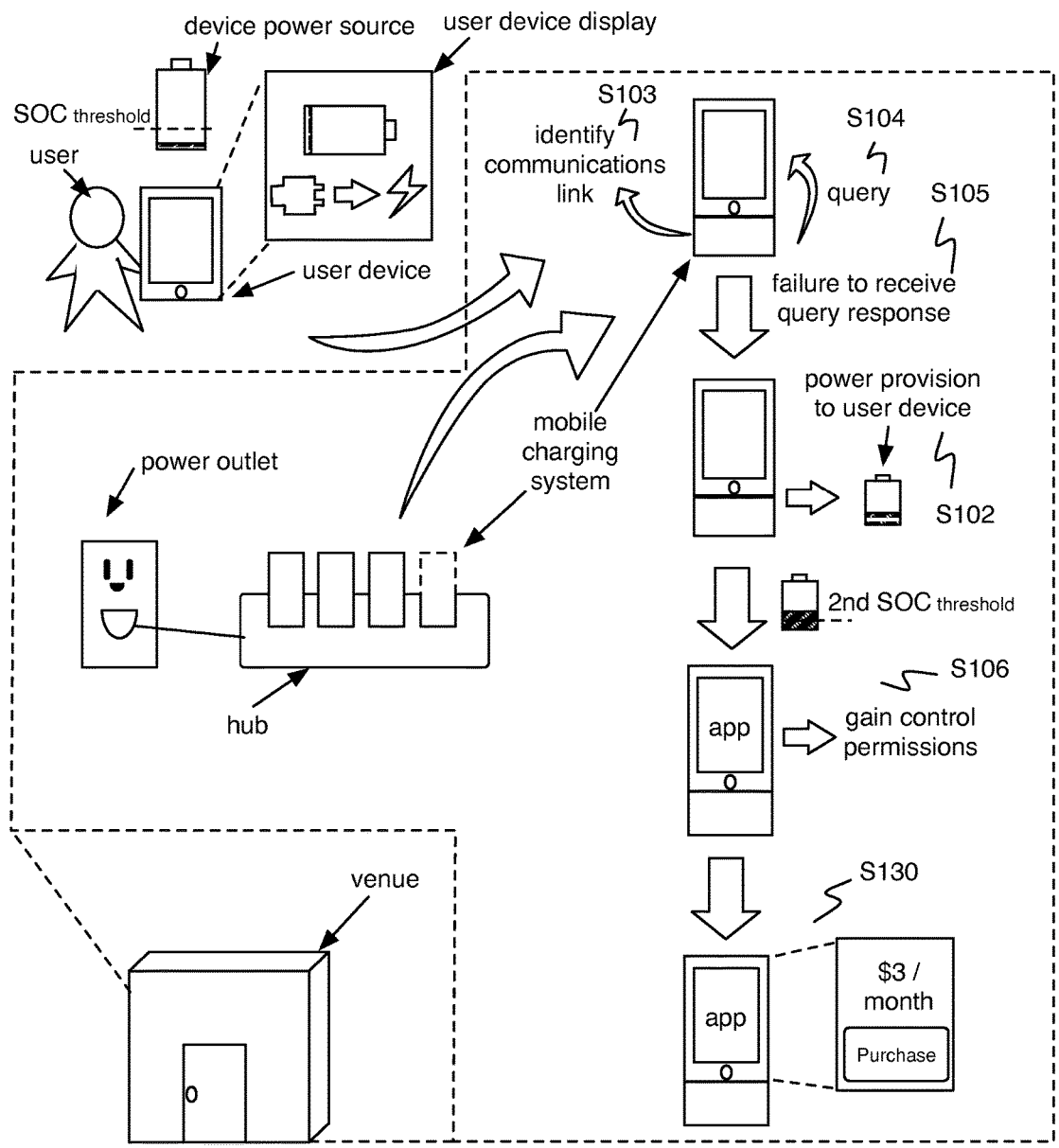
FIG. 8 is a schematic representation of a third variation of the method of utilizing a mobile charging system in which the mobile charging system provides electrical energy to the user device in an amount sufficient for the user device to run the application.

In a second variation, verification of user eligibility S160 includes determining that the user device is eligible to receive an unlimited amount of electrical energy for a predetermined period of time. The period of time can be predetermined, user-determined, dynamically determined (e.g., calculated to meet a target SOC based on the actual or anticipated charging rate), and/or determined in any other suitable manner. As shown in FIG. 8, the predetermined period of time can be specified in terms of minutes, hours, days, months, years, or any other suitable unit of time. For example, a user can purchase a 24-hour credit, which enables the user to receive an unlimited amount of electrical energy from the mobile charging system for 24 hours. In another example, the period of time is unlimited. Preferably, the user can utilize any mobile charging system associated with any venue. Alternatively, the charge credit can be associated with a specific venue, wherein the user has unlimited charging permissions only when using mobile charging systems associated with the specific venue. The charge credit can also be associated with a specific mobile charging system (e.g., with a mobile charging system that the user has reserved via the application), and the user would not be eligible to receive electrical energy from other mobile charging systems.

d. Verifying Data Integrity.

Verifying data integrity of mobile charging system software S170 functions to ensure the quality of the mobile charging system software. The remote server preferably verifies the data integrity of the mobile charging system software; however, the mobile charging system, the application, or any other suitable component can alternatively or additionally verify the data integrity of the mobile charging system software. The mobile charging system software preferably includes the program files utilized to direct the operation of the mobile charging system. Alternatively or additionally, the mobile charging system software can include log files, documentation on using the program files, or any other electronic, storable component associated with the mobile charging system. The data integrity of the mobile charging system software preferably includes a lack of unauthorized modification of the software (e.g., no unauthorized addition of files to the software, no unauthorized tampering with the program files, no malware, etc.). The data integrity of the mobile charging system software can also include proper functionality (e.g., lack of interfering software bugs, sufficient memory and/or processing power to execute the software, etc.) of the mobile charging system software.

In a first variation, verifying the data integrity of the mobile charging system software S170 includes scanning the mobile charging system software; generating a diagnostic result based on scanning the mobile charging system software; and determining the data integrity of the mobile charging system software based on the diagnostic result.

Scanning the mobile charging system software of the first variation functions to examine the features of the mobile charging system software. Preferably, the mobile charging system scans the mobile charging system software. Alternatively, the remote server can remotely scan the mobile charging system software (e.g., through communicating with the communications module of the mobile charging system, through a communication module of the user device, etc.). However, the application or any other suitable component can scan the mobile charging system software. The component scanning the mobile charging system software preferably performs the scan by running a scanning program loaded on the component performing the scan. However, the scan can alternatively be performed through any other suitable means. The scanning program is preferably updated through communication between the remote server and the component with the scanning program (e.g., the remote server updates a scanning program on the mobile charging system via communicating with the mobile charging system through the mobile charging system communication module). Alternatively the scanning program can be updated through communication between the application and the component with the scanning program (e.g., the application updates a scanning program on a mobile charging system when a communications link is established between the mobile charging system and the user device with the application). For example, the user can download a new version of the application on the user device, and the new version of the application can include an updated version of the scanning program for the mobile charging system to use. When a communications link is established between the application and a mobile charging system, the application sends the updated version of the scanning program to the mobile charging system for future use. In another example, an updated version of the scanning program can be uploaded to the remote server. The remote server can establish a communication link with the communications module of a mobile charging system, and the remote server can send the updated scanning program to the mobile charging system for future use. However, the scanning program can be updated by any other suitable means. Scanning the mobile charging system software preferably includes inspecting the contents of software program files. Alternatively, scanning the mobile charging system software can include scanning for a list of program files, for unauthorized addition of files, for unauthorized modification of files, for the integrity of specific files, and/or any other suitable examination of the mobile charging system software.

In the first variation, generating a diagnostic result based on scanning the mobile charging system software functions to produce information indicative of the status of the mobile charging system software. The mobile charging system preferably generates the diagnostic result, but the remote server, the application, or any other suitable component can alternatively or additionally generate the diagnostic result. The diagnostic result can be a summary (e.g., logs of events or behavior, statistics about the software or the electrical energy provision of the mobile charging system, a list of files present in the software, etc.), an outcome (e.g., no malware found), mobile charging system data (e.g., data regarding users of the mobile charging system), and/or the program files of the mobile charging system software. The diagnostic result can alternatively include any other electronic information indicating the status of the mobile charging system software.

In the first variation, determining the data integrity of the mobile charging system software based on the diagnostic result functions to determine the quality of the mobile charging system software. The remote server preferably receives the diagnostic result from the application prior to determining the data integrity of the mobile charging system. However, the application, the mobile charging system, or any other suitable component can determine the data integrity of the mobile charging system software. In one example, the mobile charging system scans the mobile charging system software, generates a diagnostic result, and determines the data integrity of the mobile charging system software based on the diagnostic result. Determining the data integrity of the mobile charging system software preferably includes analyzing the diagnostic result for a lack of unauthorized modification of the software (e.g., inspecting a list of files to ensure a lack of unauthorized addition of files to the software, inspecting parts of files to ensure a lack of unauthorized tampering with the program files, comparing the program files against known malware identifiers to check for the existence of malware, etc.). For example, the remote server can receive a diagnostic result from an application, wherein the diagnostic result includes a list of mobile charging system program files and their file sizes. The remote server can compare the list of files and file sizes to a list of expected files and file sizes in order to check for a lack of unauthorized tampering and/or addition of files. Analyzing the diagnostic result can also include determining that the mobile charging system software is properly functioning (e.g., running software tests to check for lack of interfering software bugs, inspecting logs of memory usage and/or processing power to execute the software, etc.).

As shown in FIG. 6, verifying the data integrity of the mobile charging system software S170 can additionally include sending a mobile charging system identifier to the remote server S194; and storing, at the remote system, a set of mobile charging system information S195. Sending a mobile charging system identifier to the remote server S194 functions to inform the remote server of the identity of the relevant mobile charging system. The mobile charging system identifier is preferably sent by the mobile charging system to the application, which sends the mobile charging system identifier to the remote server. Alternatively, the mobile charging system identifier can be directly sent from the mobile charging system to the remote server (e.g., via the data communication system of the mobile charging system). However, the remote server can receive the mobile charging system identifier through any other suitable means.

Storing, at the remote system, a set of mobile charging system information S195 functions to save—for future use—information regarding the mobile charging system. Preferably, the mobile charging system information is based on the mobile charging system identifier and the diagnostic result generated from scanning the mobile charging system software. The remote server can leverage the mobile charging system identifier to associate the diagnostic result with the corresponding mobile charging system. The remote server can subsequently store the diagnostic result or information derived from the diagnostic result (e.g., information derived from analyzing the diagnostic result). The mobile charging system can also be based on the result from verifying the data integrity of the mobile charging system. Alternatively, the mobile charging system information can be based on the mobile charging system identifier and the mobile charging system data indicative of the status of the mobile charging system software. However, the mobile charging system information can also be any other suitable information regarding the mobile charging system.

e. Providing Electrical Energy.

Controlling the mobile charging system to provide electrical energy to the user device S180 functions to charge the user device. Electrical energy provision can be controlled by the mobile charging system, the application, or by any other suitable computing system. Controlling electrical energy provision preferably includes monitoring the amount of electrical energy provision over time, the rate of electrical energy provision, the current user device SOC, and/or any other characteristic of electrical energy provision. For example, the mobile charging system can record, after every minute, the amount of electrical energy that has been provided to a user device. In another example, during a charging situation, the application periodically checks the user device SOC to see if a goal user device SOC has been reached. However, electrical energy provision can be otherwise monitored. Electrical energy provision can be monitored by the controlling system (e.g., the application, the mobile charging system, etc.), by the system providing electrical energy (e.g., the mobile charging system), and/or by any other suitable system. However, controlling electrical energy provision can also exclude the monitoring of electrical energy provision, and/or include any other suitable manner of electrical energy control.

Controlling electrical energy provision S180 can also include sending a charge command to the mobile charging system, wherein the charge command instructs the mobile charging system to begin providing electrical energy to the user device. The application preferably sends (e.g., through the communications link between the user device and the mobile charging system) the charge command to the mobile charging system, but the remote server and/or any other suitable component can send the charge command. The mobile charging system preferably receives the charge command and executes the instructions (e.g., via the mobile charging system processor) to charge the user device. However, any other means of controlling the mobile charging system to provide electrical energy to the user device can be used.

Controlling electrical energy provision S180 can be in response to verification of the user eligibility and/or verification of the data integrity of the mobile charging system software. For example, controlling the mobile charging system to provide electrical energy will be prevented unless a component has successfully verified both the user eligibility and the data integrity of the mobile charging system. In other examples, the mobile charging system will provide electrical energy to the mobile device without some or any of the prior verifications. Alternatively or additionally, controlling electrical energy provision S180 can be based on the user account (e.g., providing an amount of electrical energy up to an amount specified by the user account), the user eligibility (e.g., providing electrical energy at different wattages based on the eligibility of the type of user device to receive energy at certain wattages), a determined amount of electrical energy (e.g., predetermined, learned, dynamically calculated, etc.), and/or provide energy based on any other suitable criteria.

In a first variation, wherein the mobile charging system controls power provision, the mobile charging system can initiate power supply to the user device through the device adapter in response to receipt of a payment confirmation from a payment system, the application (e.g., the user device), the remote server, and/or any other suitable component. In a second variation, wherein the application controls power provision, the application can generate unlocking instructions and/or power provision instructions for the mobile charging system, and send the instructions to the mobile charging system connected to the user device in response to receipt of payment confirmation from the payment system. Alternatively, the unlocking instructions and/or power provision instructions can be generated by the payment system, wherein the application relays the instructions to the mobile charging system. In a third variation, the payment system sends a first set of instructions to the mobile charging system and sends a second set of complementary instructions to the user device. Power provision is preferably initiated by the mobile charging system in response to receipt of the complementary second set of instructions from the connected user device. However, power provision can be initiated in any other suitable manner.

Controlling electrical energy provision S180 can additionally include providing power to the user device. In a first variation of the method 100, the providing power to the user device can include supplying power from the power supply of the mobile charging system (e.g., the batteries). In a second variation of the method 100, providing power to the user device can include converting power supplied by a secondary charging technology into power suitable for the user device. For example, the mobile charging system can convert and supply power received from an inductive charging system (e.g., Qi or PMA), a WiFi charging system, EM charging system, RF charging system, or any other suitable charging technology to the user device.

f. Controlling the Mobile Charging System to Adjust Electrical Energy Provision.

Controlling the mobile charging system to adjust electrical energy provision to the user device S190 functions to modify the mobile charging system charging behavior. Electrical energy provision adjustment can be controlled by the application on the user device, by the mobile charging system, or by any other suitable computing system. A component preferably controls electrical energy provision adjustment by sending command instructions to the mobile charging system (e.g., the application sends a command instruction to the mobile charging system to increase amount of electrical energy provision by 0.2 joules). For example, a user can pay for an additional hour of charging, leading to a change in user eligibility to receive electrical energy from a mobile charging system. The remote server can update the relevant user account information and notify the application regarding the change in user eligibility. In response to receiving the notification, the application can send a command instruction to the mobile charging system to provide electrical energy for an additional hour, and the mobile charging system can execute the command instructions. However, any other suitable means can be used for a component to control the mobile charging system or for the mobile charging system to adjust the electrical energy provision.

The types of electrical energy provision parameters that can be adjusted include the amount of electrical energy (e.g., from 2 joules to 3 joules), rate of electrical energy provision (e.g., from 0.2 watts to 0.3 watts), duration of electrical energy provision (e.g., from 2 minutes of charging to 3 minutes), goal user device SOC (e.g., from 80% goal SOC to 100% goal SOC), and/or any other suitable electrical energy provision parameters. Adjustments of the electrical energy provision can include downward adjustments (e.g., from 0.2 watts to 0 watts), upward adjustments (e.g., from 0.2 watts to 0.4 watts), adjustments in how electrical energy provision is measured (e.g., from providing electrical energy based on a specific rate (e.g., 0.1 watts) to providing energy based on an absolute amount of energy (e.g., 5 joules)), and/or any other suitable adjustments to electrical energy provision.

In a first variation, the mobile charging system is controlled to adjust electrical energy provision in response to a change in the user eligibility. The change in the user eligibility can include a change in user account status (e.g., an expiration of a user account subscription for unlimited charge over 24 hours), the user device (e.g., the user switches to an unapproved user device), a status of a mobile charging system reservation (e.g., if a user reserves a specific mobile charging system through the application and subsequently cancels the reservation), the user device software (e.g., the user device operating system version changes to an unapproved version), the mobile charging system software (e.g., the mobile charging system detects unauthorized software running on the mobile charging system), and/or be any other suitable change in user eligibility. The change in the user eligibility can also include any other suitable modifications to the user eligibility. In a first example of the first variation, the change in user eligibility can be the amount of energy supplied to the respective user device substantially meeting or exceeding the amount of energy that was paid for (e.g., for the charging session). The electrical energy provision can subsequently be shut off, paused (e.g., awaiting a secondary charging credit purchase or the occurrence of an eligibility-enabling event, etc.), slowed, or otherwise adjusted in response to the amount of energy substantially meeting or exceeding the authorized limit. In a second example of the first variation, the change in user eligibility can be an increase in the power provided to the user device after the user purchases an increased power provision subscription. In a third example of the first variation, the change in user eligibility can be determining that the user device SOC has reached a target SOC. The target SOC can be predetermined (e.g., set at 98% for all devices), user-determined (e.g., based on user preferences, user selection during payment, etc.), determined based on historical mobile charging system use, or determined in any other suitable manner. In a fourth example of the first variation, the change in user eligibility can be the satisfaction of a time condition, wherein the user device has been charged for a predetermined period of time. The period of time can be predetermined, user-determined, dynamically determined (e.g., calculated to meet a target SOC based on the actual or anticipated charging rate), and/or determined in any other suitable manner.

In a second variation, the mobile charging system is controlled to adjust electrical energy provision in response to the occurrence of an end event. As above, the adjustment can include ceasing, slowing, increasing, or otherwise adjusting electrical energy provision. The adjustment can be gradual, sudden (e.g., within a threshold period of time, such as instantaneously or within 1 ms), or be performed at any suitable rate. The end event can be a disconnection of the communications link (e.g., a wireless Bluetooth connection, a wired electrical connection, etc.) between the user device and the mobile charging system. For example, when a user unplugs the mobile charging system device adapter from the user device, an end event has occurred. The end event can also be any other suitable event that interferes with the communications link between the user device and the mobile charging system, or be any other suitable end event.

g. Detecting a User Device SOC Below a SOC Threshold.

The method 100 can additionally include detecting a user device SOC falling below a SOC threshold, or detecting that the user device SOC has fallen below a SOC threshold S100.

S100 functions to identify that a user device will soon require recharging. The user device SOC can be detected by the user device, detected by the application performing the method 100, or detected by any other suitable component. The SOC threshold can be predetermined, user-determined (e.g., from user settings), learned (e.g., based on user charging habits, population charging habits, user device use habits, etc.), dynamically calculated (e.g., wherein the SOC threshold is set such that there is enough power to power the components required to run the application until a user can reach a mobile charging system), and/or determined in any other suitable manner. In response to determining that the user device SOC is below the SOC threshold, the application and/or other suitable components can generate a query to identify the nearest mobile charging systems, notify the user of a user device SOC status, notify venues that a nearby user device is at a certain SOC status, send a request to a second user device (e.g., a smartwatch in communication with the user device) to display nearby venues associated with a mobile charging system, and/or perform any other suitable action. In one example, the application detects a user device SOC below the SOC threshold, notifies venues with mobile charging systems within a predetermined distance of the user device, and venues can subsequently compete (e.g., through a bidding process, such as bidding money, rates, deals, advertisements, etc.) to have the application display a promotion to the user via the application. In another example, the application detects a user device SOC below an SOC threshold that indicates the user device will soon have insufficient electrical energy to operate. In this example, the application sends a request to a smartwatch that is communicatively linked with the user device, wherein the smartwatch is requested to identify and display the nearest mobile charging systems.

In a first variation, detecting that a user device SOC has fallen or is falling below a SOC threshold S100 includes periodically activating (e.g., waking up or launching) the application and determining the user device SOC using the application. In a second variation, detecting that a user device SOC has fallen or is falling below a SOC threshold S110 includes the user launching the application on the user device, and the launched application detecting that the user device SOC is below or is falling below the SOC threshold. In a third variation, the user device tracks the user device SOC, and the user device launches the application in response to detecting that a user device SOC is below or is falling below the SOC threshold. However, determining that the user device SOC has fallen below the threshold SOC S110 can be determined in any other suitable manner.

h. Directing a User to a Venue.

The method 100 can additionally include directing a user to a venue associated with a mobile charging system S120. S120 functions to identify venues near the user that have mobile charging systems. The application preferably directs the user to the venue (e.g., by querying the remote server for nearby venue locations and displaying the venues to the user), but the remote system, the mobile charging system and/or any other suitable component can direct the user to the venue. Directing a user to a venue associated with a set of mobile charging systems S120 preferably includes: determining the locations of mobile charging systems within a predetermined distance of the user device; and displaying a set of venues associated with the mobile charging systems to the user on the user device. However, the user can be directed to the venue in any other suitable manner. The user is preferably directed to the venue in response to determination that the user device SOC is below a SOC threshold S100, but can alternatively be directed to the venue in response to receipt of a request from a user (e.g., wherein the user opens the application on the user device and requests the mobile charging system locations), or in response to determination of any other suitable query event.

Determining the locations of mobile charging systems within a predetermined distance of the user device preferably includes querying a remote database for the locations, but can alternatively include directly querying the mobile charging systems (e.g., mobile charging systems connected to the same network as the user device) or querying any other suitable source for the mobile charging system locations. The mobile charging system locations can be the locations of individual mobile charging systems, the locations of venues known or estimated to be associated with mobile charging systems, or be any other suitable location. The predetermined distance is preferably relative to a user device location or a user-specified location, but can be relative to any other suitable reference point. The predetermined distance can be a geographic radius (e.g., within 5 mi, within walking distance, within driving distance, etc.), a user-determined or predetermined geofence (e.g., a geofence defined around a block, a building, etc.), or be any other suitable distance.

Displaying a set of venues associated with the mobile charging systems to the user on the user device functions to present the locations of the mobile charging systems. Displaying the set of venues can include displaying a map including an icon representing each venue of the set, displaying a list of the venues (e.g., as an ordered set, ordered based on user preferences, mobile charging system availability, etc.), displaying a set of navigation instructions that direct the user to a venue of the set, or displaying the set of venues in any other suitable manner.

In one variation, a venue associated with a mobile charging system is displayed based on the operability of the mobile charging system. The operability of the mobile charging system is preferably indicated by the mobile charging system information stored by the remote server S195. However, operability of the mobile charging system can be indicated based on the diagnostic result, the mobile charging system data, the verification of data integrity of the mobile charging system software, and/or any other suitable criteria. Operability of the mobile charging system preferably indicates whether the mobile charging system software is functioning as intended. Alternatively or additionally, the operability of the mobile charging system can indicate whether the mobile charging system hardware can operate to provide electrical energy to the user device. However, the operability of the mobile charging system can indicate any other suitable characteristic of the mobile charging system. Preferably, the application will display the venue to the user in response to verifying proper operability of the mobile charging system. Verifying proper operability of the mobile charging system preferably includes verifying that the mobile charging system software is functioning as intended and that the mobile charging system hardware can operate to provide electrical energy to the user device. Proper operability of the mobile charging system can additionally or alternatively include the satisfaction of any other property regarding the mobile charging system. The application can also prevent the display of the venue to the user in response to failing to verify proper mobile charging system operability. However, venues associated with a mobile charging system can be displayed by any other means.

Directing the user to the mobile charging system S120 can additionally include automatically selecting a venue from the plurality of venues associated with a set of mobile charging systems, which can function to filter the set of available venues to minimize user confusion. The venue can be selected based on the venue proximity to the user, the number of available mobile charging systems at the venue, the venue category, a temporal parameter (e.g., the time of the day, day of the week, month, etc.), the weather, user preferences, user history (e.g., historical user selections for mobile charging system venues), vendor ranking, or based on any other suitable venue parameter or circumstantial parameter. In a first example, the venues can be selected based on the time of day, wherein café s can be selected in the morning, sandwich shops selected at lunch, and bars selected in the evening. In a second example, the venues can be selected based on venue parameters, wherein venues can be selected based on ratings, based on the respective promotional status, or based on any other suitable venue parameter.

In the variation of the method 100 wherein the venue is selected for display based on the number of available mobile charging systems at the venue, the method 100 can additionally include determining the number of available mobile charging systems at the venue. An available mobile charging system can be a mobile charging system that is not currently being used, that is currently occupied but will not be used by the time user arrives at venue (e.g., determined based on charging rate and/or difference between the occupying device's instantaneous SOC and target SOC), that is storing energy above an availability energy threshold (e.g., above 5 W), that has validated software or had validated software (e.g., as verified for the last respective charging session, verified within a threshold time period of an instantaneous time by the mobile charging system, etc.), or be a mobile charging system satisfying any other suitable availability condition. In a first example, the mobile charging system availability can be determined by comparing the number of mobile charging systems estimated/known to be at the venue and the number of users that have been directed to the venue through the method 100, the number of mobile charging systems reserved by incoming users, and/or the number of user accounts currently associated with mobile charging system identifiers (e.g., using mobile charging systems) associated with the venue. In a second example, the mobile charging system availability can be determined by querying the venue (e.g., the charging hub or kiosk), querying the charging hub, or querying the mobile charging systems at the venue to determine the amount of energy stored in each mobile charging system (e.g., the SOC of each mobile charging system). The response to the query can be sent, along with a mobile charging system identifier, to the remote server via the application, the charging hub, or the mobile charging system communication system. The remote server can subsequently update a set of mobile charging system information corresponding to the mobile charging system identified by the identifier. In a third example, the mobile charging system availability can be determined based on the number of mobile charging systems coupled to the charging hubs. However, the number of available mobile charging systems can be determined using a combination of the above or in any other suitable manner.

Directing the user to the mobile charging system S120 can additionally include facilitating user mobile charging system reservation, wherein the identified mobile charging system will be reserved for the user for a predetermined period of time, after which the mobile charging system will be open to other users for use. Other users are preferably precluded from using the reserved mobile charging system to charge their devices during the reservation period, but can alternatively be permitted to use the reserved mobile charging system. The reserved mobile charging system can be physically locked to the charging hub, digitally locked (e.g., wherein only the reserving user device can unlock it during the reservation period), or otherwise reserved for the user. The user device can be identified using a device identifier or by the native application running on the user device. The user can reserve a specific mobile charging system, or can reserve any mobile charging system at the venue. In the latter instance, the method 100 can additionally include assigning a mobile charging system to the user. Alternatively, the reservation can be sent to the venue, wherein the venue can reserve a mobile charging system for the user. This variant can additionally have the benefit of notifying venues of incoming deal flow. Alternatively, a mobile charging system can be automatically reserved in response to user selection of the venue. However, the mobile charging system can be otherwise reserved for the user. Reserving the mobile charging system can additionally include paying to reserve the mobile charging system, pre-paying for energy from the reserved mobile charging system, or otherwise processing payment during the reservation process.

i. Providing Electrical Energy in an Amount Sufficient for the User Device to Run the Application The method 100 can additionally include providing, via the mobile charging system, electrical energy to the user device in an amount sufficient for the user device to run the application S102. This can be performed independent of user eligibility verification, and can function to charge user devices with little or no SOC to a state where the user device can run the application. The mobile charging system preferably provides electrical energy within the framework of a master/slave model of communication, wherein the master (e.g., the mobile charging system) has unidirectional control over the slave (e.g., the application) and the electrical energy provision to the user device. In one example, a mobile charging system identifies a communications link with a user device carrying insufficient charge to run the application. In response to identifying that the user device carries insufficient charge, the mobile charging system—functioning as the master—provides electrical energy to the user device in an amount sufficient for the user device to run the application. The mobile charging system then triggers the application to be launched on the user device, and upon the user device successfully launching the application, the application notifies the mobile charging system (e.g., via the communications link). The master/slave roles subsequently switch, such that the mobile charging system becomes the slave and the application becomes the master with unidirectional control over the electrical energy provision. However, any other suitable models of communication can facilitate electrical energy provision by the mobile charging system in the amount sufficient for the user device to run the application. Preferably, the mobile charging system provides electrical energy through the communications link with the user device, but can also provide electrical energy through any other suitable means. The communications link is preferably a wired electrical connection (e.g., a micro-USB connector, a USB on-the-go connector, a Firewire connector, a Lighting Connector™, etc.) but can also be a wireless connection (e.g., WiFi, Bluetooth, etc.).

The mobile charging system provision of sufficient electrical energy S102 is preferably in response to identifying that the user device carries insufficient charge. Identifying that the user device carries insufficient charge is preferably performed by the mobile charging system (e.g., by querying the user device via the communications link between the user device and the mobile charging system), but can alternatively or additionally be performed by the application (e.g., by querying the user device during the period of time when the user device has sufficient SOC to run the application), the remote server (e.g. by remotely querying the user device), or any other suitable component. Identifying that the user device carries insufficient charge preferably includes detecting a user device SOC below a first SOC threshold. The first SOC threshold can be predetermined (e.g. a SOC below which the average user device has insufficient charge to operate, 1% SOC, etc.), learned (e.g., based on individual user charging habits, population charging habits, user device use habits, etc.), and/or dynamically calculated (e.g., wherein the SOC threshold translates to sufficient power for the components to run the application until a user can reach a mobile charging system), and/or determined in any other suitable manner. In one example, the application periodically activates (e.g., wakes up, launches) to record the user device SOC, and the first SOC threshold is determined based on the last recorded SOCs of user devices before the user devices shut off due to insufficient charge. The application can send the recorded SOCs to the remote server, which can notify a mobile charging system (e.g., through communication with the mobile charging system communication module) of the last recorded SOC of the user device. However, identifying that the user device carries insufficient charge can include any other suitable means.

The amount of electrical energy that is sufficient for the user device to run the application S102 is preferably determined by providing an amount of electrical energy to charge the user device to a predetermined SOC (e.g., 1% SOC, 5% SOC, etc.). Alternatively, the amount of electrical energy that is sufficient for the user device to run the application can be determined by providing an amount of electrical energy to allow the user device to run for a set amount of time, which can be predetermined (e.g., 2 minutes, 5 minutes), learned (e.g., based on the amount of time an average user takes to open the application and pay to charge the user device), dynamically calculated (e.g., adjusted to account for the rate of battery usage for the particular user device and the user device state), and/or otherwise determined. The amount of electrical energy that is sufficient for the user device to run the application can also be determined by providing an absolute amount of energy (e.g., 5 joules, 2 watt-hours) or an absolute rate of energy provision (e.g., 0.5 watts). The absolute amount of energy provision can be predetermined (e.g., 3 joules, 3 watt-hours, 1 watt, etc.), learned (e.g., based on empirical data derived from a population of user devices), and/or dynamically calculated (e.g., adjusted to account for the type of user device and the current battery status of the user device). However, the amount of electrical energy that is sufficient for the user device to run the application can be determined using a combination of the above or in any other suitable manner.

In a first example, the amount of electrical energy provided is based on the type of user device. In this example, the mobile charging system identifies, via the communications link, the type of user device connected to the mobile charging system. In a specific example, the mobile charging system identifies that a user device is a certain type of mobile device (e.g., smartphone, tablet), and based on that type of mobile device, the mobile charging system provides a predetermined amount of energy (e.g., 1 mAH for a smartphone, 1.5 mAH for a tablet). Preferably, the mobile charging system software includes a file that specifies the amount of electrical energy to provide to the use device depending on the type of user device. Alternatively, the mobile charging system can query (e.g., through the communications module) the remote server for a response indicating an amount of electrical energy to provide depending on the type of user device. However, the mobile charging system can determine the amount of electrical energy to provide to the user device through any other suitable means.

In a second example, the amount of electrical energy provided is predicted via a model based on empirical data collected by mobile charging systems. The data can include records of the amounts of energy that were provided to user devices in order to sufficiently charge the user devices to a state where the user devices could start their operating systems. The data can also include the type of user device encountered, location of charging, time of day during charge, type of communications link established between the mobile charging system and user device, and/or any other suitable criteria. The data can be used to train a model, which can be used by a mobile charging system to predict an amount of electrical energy to provide to the connected user device based on different features (e.g., features of the user device, location, temperature, etc.). Preferably, the data collected by mobile charging systems is sent to the application, which sends the data to the remote server to train and store the model. The remote server can run the model based on the features of a charging situation (e.g., when the application establishes a communications link with a mobile charging system, the application can send the features (e.g., features of the user device, location, temperature, etc.) of the current situation to the remote server), and the remote server can respond to the application with results from running the model. However, any suitable component can receive, send and/or analyze the data. Any suitable component can also train, store, and/or run the model.

As shown in FIG. 8, in a variation of S102, providing electrical energy to the user device in an amount sufficient to run the application S102 can include identifying a communications link between the user device and the mobile charging system S103; querying the user device for data indicative of the user device SOC S104; and in response to failing to receive a query response from the user device, providing electrical energy via the mobile charging system to the user device in the amount sufficient for the user device to run the application S105.

Identifying the communications link between the user device and the mobile charging system S103 of the variation functions to identify an established connection for communications between the user device and the mobile charging system. The communications link is preferably a wired electrical connection (e.g., through a micro-USB connector, a USB on-the-go connector, a Firewire connector, a Lighting Connector™, etc.) but can also be a wireless connection (e.g., WiFi, Bluetooth, etc.). The communications link can be determined by the mobile charging system, the user device, a remote system, or by any other suitable system.

Querying the user device for data indicative of the user device SOC S104 of the variation functions to ask the user device for information indicative of the user device SOC. The mobile charging system preferably queries the user device via the communications link. Further, the mobile charging system preferably queries the user device in response to identifying the communications link. Alternatively, the remote server or any other suitable component can query the user device.

Providing electrical energy via the mobile charging system to the user device in the amount sufficient for the user device to run the application, in response to failing to receive a query response from the user device S105 of the variation functions to charge the user device to a state where the user device can successfully operate the application. The mobile charging system preferably expects to receive the query response; however, the remote server or other suitable components can alternatively or additionally expect to receive the query response. In one example, a failure to receive the query response from the user device indicates that the user device is at an insufficient SOC to properly operate.

The variation can additionally include gaining, at the application, control permissions over the electrical energy provision from the mobile charging system S106. Gaining control permissions S106 is preferably in response to the mobile charging system failing to receive a query response from the user device. However, the application can alternatively gain control permissions S106 without failing to receive a query response. Preferably, the control permissions are unidirectional over the mobile charging system provision of electrical energy. In one example, a master/slave model of communication governs the relationship between the mobile charging system and the application. In the example, the mobile charging system starts as the master and provides electrical energy to the user device in an amount sufficient to run the application. The application subsequently gains control permissions, and the application thus becomes the master.

j. Sending a Confirmation Response.

Figure 1B:
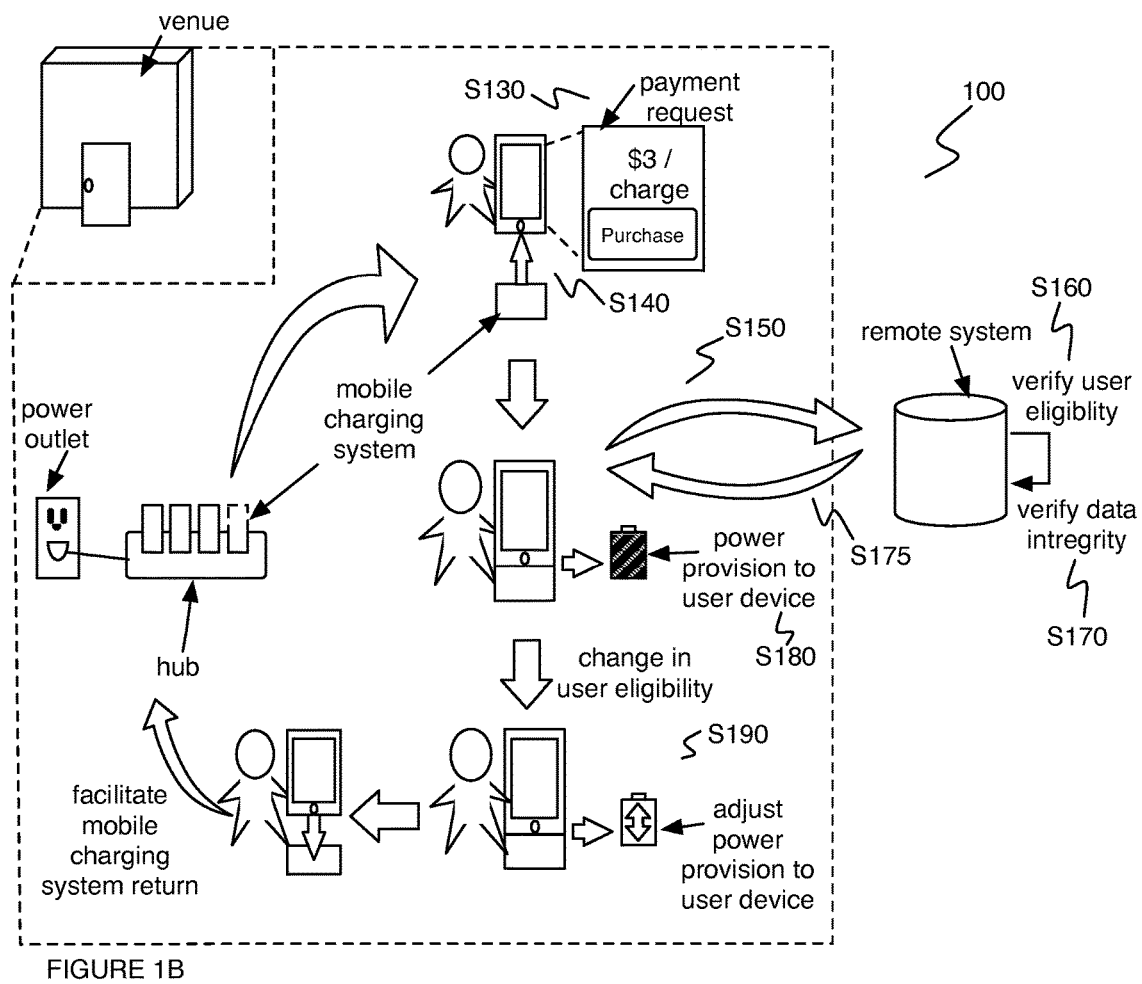

As shown in FIGS. 1B and 6, the method 100 can additionally include sending a response confirming the verification of user eligibility and data integrity of the mobile charging system software S175. The confirmation response is preferably sent by the remote server to the application in response to verification of the user eligibility S160 and data integrity of the mobile charging system software S170. However, any other suitable component can send and/or receive the confirmation response. Controlling the mobile charging system to provide electrical energy S180 can include controlling the mobile charging system to provide electrical energy in response to receiving the confirmation of the verification of user eligibility and data integrity.

k. Facilitating Payment for Energy.

As shown in FIGS. 1B, 6, and 7, the method 100 can additionally include facilitating payment for energy from the mobile charging system and receiving payment confirmation S130. S130 functions to enable the user or venue to pay to charge the user devices. Payment is preferably facilitated in response to mobile charging system connection to the user device, but can alternatively be facilitated at any other suitable time. The user preferably pays for energy from mobile charging systems, but the venue or entities associated with the venue can alternatively or additionally pay for energy from mobile charging systems. For example, a venue can pay for energy to be provided by mobile charging systems at the venue, thus enabling users at the venue to charge their user devices via the mobile charging systems without the users having to pay. A user can be deemed to be at a venue based on the mobile device identifier (e.g., wherein the mobile device identifier is associated with the venue), a geographic location of the user device substantially matching the venue's geographic location, a geographic location of the mobile charging system substantially matching the venue's geographic location, or be determined in any suitable manner. The payment is preferably currency (e.g., US dollars, Bitcoin credits, etc.), but can alternatively be any other suitable form of payment. The energy is preferably quantified in units of energy (e.g., Watts), but can alternatively be quantified in units of charge, wherein one unit of charge can be the amount of energy required to bring the user device to a target SOC, quantified in units of time, or quantified in any other suitable manner. Confirming user payment can additionally include associating the identifier of the mobile charging system connected to the user device with the user account.

The payment rate can be the same for all user devices, but can alternatively vary according to the user device type, the desired amount of energy, the actual or requested charging rate, or based on any other suitable characteristic specific to the user device or the user's preferences. Alternatively or additionally, the payment rate can be determined based on population characteristics. For example, the payment rate can be varied based on the instantaneous demand from the user population for mobile charging systems in general, demand for mobile charging systems in the geographic area proximal the user device, demand for mobile charging systems at the venue, or based on any other suitable population characteristic. The population demand can be determined based on the number of mobile charging systems currently connected to user devices, the number of mobile charging systems that have been reserved, the number of queries for nearby mobile charging systems, the historical population demand for mobile charging systems, or based on any other suitable measure of instantaneous or future mobile charging system demand.

In a first variation, the payment is facilitated by the mobile charging system. In this variation, the mobile charging system sends display instructions over the device adapter to display payment instruction entry options on the user device. In response to receipt of payment instructions from the user device, the mobile charging system verifies the payment with a remote server (e.g., a third-party payment system) based on the payment instructions. Charging is preferably initiated by the mobile charging system in response to payment verification.

In a second variation, the payment is facilitated by the application on the user device. In this variation, the application controls the user device to display payment instruction entry options, and sends the received payment information to a payment system. The payment system can be a remote server, a second application on the user device (e.g., a payment application, such as Square, Google Wallet, etc.), an API-based payment system integrated into the device operating system (e.g., Stripe), or any other suitable payment system. Charging is preferably initiated by the mobile charging system in response to payment verification by the payment system.

l. Collecting a Mobile Charging System Use History.

As shown in FIG. 7, the method 100 can additionally include collecting a mobile charging system use history for one or more user accounts and/or user devices S196. The application preferably collects the mobile charging system use history; however the mobile charging system or other suitable components can also collect the mobile charging use history. The mobile charging system use history can include records of the mobile charging systems used by a user, the types of mobile charging systems used by a user, the venues selected or visited by the user for the mobile charging system use, the times associated with mobile charging system use, the conversion rate between venue display and/or mobile charging system reservation and actual user appearance at the venue, or any other suitable mobile charging system-related or user-related information. The mobile charging system use history can be used to refine the directing of the user to a venue S120. For example, the mobile charging system use history can indicate a user preference for a type of venue (e.g., restaurants). Based on the user preference, the application can highlight restaurant venues when displaying the venues associated with mobile charging systems. The mobile charging system use history can also be used for targeting promotions (e.g., advertisements, coupons, etc.) to the user. For example, if the mobile charging use history indicates that the user has predominantly used mobile charging systems at clothing stores, clothing promotions can be displayed to the user. Preferably, the promotions are presented to the user at the application, but can be presented at any other suitable component. The promotions can take the form of images, videos, audio, text, and/or any other suitable multimedia form. However, the promotions can also be presented to the user without using the mobile charging system use history. The mobile charging system use history can also be used for refining any other suitable portion of method 100.

m. Providing Internet Access.

As shown in FIG. 6, the method 100 can additionally include providing Internet access to the user device through the mobile charging system S192. The user device is preferably provided Internet access through the mobile charging system (e.g., through the data communication system of the mobile charging system). Alternatively, the mobile charging system can function as a physical Internet key for the user device, wherein the user device can connect to a local router or other communication hub as long as the user device is connected to the mobile charging system. A mesh network including mobile charging systems, kiosks, and/or any other suitable components can also be created and used to facilitate Internet access and/or communication amongst the nodes of the mesh network. Information is preferably intermittently transmitted with power through the device adapter (e.g., asynchronously transmitted), but can alternatively be concurrently transmitted or otherwise transmitted. However, user device connectivity can be facilitated in any other suitable manner.

n. Renting the Mobile Charging System for a Second User or Second User Device.

The method 100 can additionally include renting the mobile charging system for a second user or for a second user device. In a first variation, the method 100 can treat payment as a standing credit associated with a user account. Other users can add charge units (e.g., pay for) to a first user account, wherein the user device associated with the first user account will not have to pay for charge units in order to receive power from the mobile charging system. Alternatively, the user account can be associated with a subscription for a predetermined period of time, wherein the user device can receive power from the mobile charging system as long as the subscription is active. In a second variation, the mobile charging system can permit device charging as long as there are still unused, paid-for charge units. For example, a first user can connect the mobile charging system to their device, pay for 1 W, use 0.5 W, and give the mobile charging system to a second user, who can then charge their device with the remaining 0.5 W. This variation can be particularly interesting when power provision is controlled by the mobile charging system.

o. Recording the Return of a Mobile Charging System.

The method 100 can additionally include recording the return of a mobile charging system, which functions to disassociate the mobile charging system use from the user account. Recording mobile charging system return can additionally function to identify the mobile charging system as an available mobile charging system for subsequent user use (e.g., wherein the mobile charging system re-appears in user queries). In a first variation, the mobile charging system return can be recorded in response to physical connection of the mobile charging system into a charging hub. The return charging hub can be the hub that is associated with the venue where the user initially retrieved the mobile charging system, or can be a different hub. In a second variation, the mobile charging system return can be recorded in response to the mobile charging system location remaining in the venue a predetermined period of time after charging cessation, wherein the mobile charging system location can be determined from an on-board location system 240, determined from a user device location as long as the mobile charging system is connected to the user device, or otherwise determined. However, mobile charging system return can be otherwise tracked.

p. Accommodating for Unreturned Mobile Charging Systems.

The method 100 can additionally include accommodating for unreturned mobile charging systems. In one variation, if the geographic location of the mobile charging system moves outside the venue boundaries and not returned to a hub within a predetermined amount of time, the address of the last user that used the mobile charging system can be identified (e.g., based on the payment information), the user can be charged for the mobile charging system, and a charging cable for the mobile charging system can be sent to the address. However, the method 100 can accommodate for unreturned mobile charging systems in any other suitable manner.

An alternative embodiment preferably implements the above methods in a computer-readable medium storing computer-readable instructions. The instructions are preferably executed by computer-executable components preferably integrated with a power supply system. The power supply system can include a communication system configured to verify payment with a remote server, a power source configured to store and supply energy, and processor configured to control power source power supply to a connected device based on payment verification with the remote server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method performed by a computer processor executing computer program instructions stored on a non-transitory medium, the method providing electrical energy to a user device including a computing system, the user device associated with a user, the electrical energy provided by a mobile charging system including mobile charging system software, the mobile charging system located at a venue, the method comprising:

detecting, at an application operating on the computing system included in the user device, a user device state of charge below a state of charge threshold;

in response to detecting the user device state of charge below the state of charge threshold, directing, via the application, the user to the venue including the mobile charging system;

identifying, at the application, a wired electrical connection between the user device and the mobile charging system;

in response to identifying the wired electrical connection, sending over a network, via the application, a user identifier to a server located remotely from the mobile charging system, the server associated with the application;

verifying, via the server, a user eligibility for electrical energy provision to the device based on the user identifier;

generating a diagnostic result regarding the status of the software included in the mobile charging system, the diagnostic result including at least one of: results of an inspection to determine whether the software includes an unauthorized file, and results of an inspection to determine whether the software includes malware;

receiving, at the server, mobile charging system data concerning the diagnostic result;

verifying a data integrity of the mobile charging system software based on the mobile charging system data;

in response to verification of the user eligibility and the data integrity of the mobile charging system software, controlling, via the application, the mobile charging system to provide electrical energy to the user device; and in response to termination of the user eligibility, controlling, via the application, the mobile charging system to cease electrical energy provision to the user device.

2. The method of claim 1, wherein the mobile charging system data comprises a record of electrical energy provision from the mobile charging system to the set of user devices.

3. The method of claim 1, further comprising:
sending a mobile charging system identifier to the remote server; and
storing, at the remote system, a set of mobile charging system information based on the mobile charging system identifier and verification of the data integrity of the mobile charging system software.

4. The method of claim 1, further comprising, in response to failing to verify the data integrity of the mobile charging system software, controlling, via the application, the mobile charging system to prevent electrical energy provision to the user device.

5. The method of claim 1, wherein controlling the mobile charging system to provide electrical energy to the user device comprises providing an unlimited amount of electrical energy for a predetermined period of time.

6. The method of claim 1, further comprising collecting a mobile charging system use history for a user account.

7. The method of claim 6, wherein the mobile charging system use history indicates a user preference for a type of venue, and wherein directing the user to the venue is based on the user preference.

8. The method of claim 1, further comprising controlling, via the application, the mobile charging system to provide Internet access to the user device, wherein the mobile charging system comprises a communication system.

* * * * *